Aug. 18, 1953     W. H. DOERFNER ET AL     2,648,994
BALL NUT AND LEVER STEERING GEAR
Filed Oct. 18, 1951
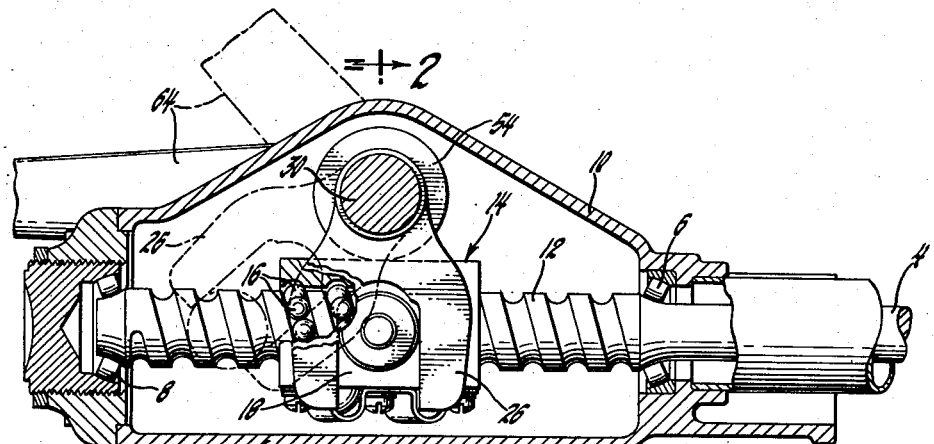
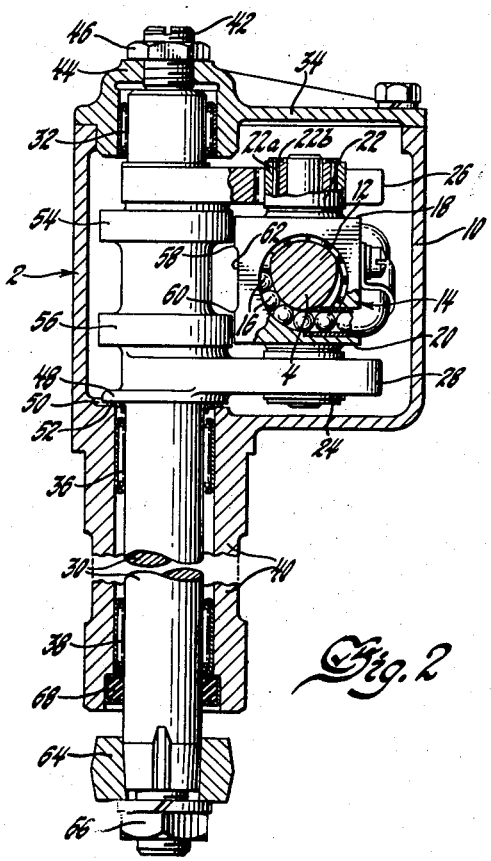
INVENTORS
William H. Doerfner &
John C. Helveston
BY
Willits, Helwig & Baillio
ATTORNEYS Patented Aug. 18, 1953

2,648,994

UNITED STATES PATENT OFFICE 2,648,994

BALL NUT AND LEVER STEERING GEAR

William H. Doerfner and John C. Helveston, Saginaw, Mich., assignors to General Motors Corporation, Detroit, Mich., a corporation of Delaware Application October 18, 1951, Serial No. 251,951

8 Claims. (Cl. 74—499)

This invention relates to steering gears for motor and other types of vehicles and more particularly to steering gears of the ball nut and lever type.

In steering gears of the ball nut and lever type it is highly desirable to provide anti-friction means for the various operating parts thereof to reduce friction to a minimum in order that maximum efficiencies might be obtained. In order to provide for the most efficient operation, some clearance must be provided between the cooperating parts. Such clearance in certain prior constructions causes undesirable turning of the nut about its worm which results in binding or scuffing particularly of the connections between the nut and pitman shaft.

One object is to provide in steering gears of the ball nut and lever type novel and improved anti-friction means between the various contacting portions thereof. Steering gears constructed in this manner not only have operated at overall efficiencies of between eighty to ninety percent but the variation in the ratio thereof is greater than that of steering gears constructed theretofore.

Another object is to provide in steering gears of the ball nut and lever type, spaced annular abutment means on the pitman shaft adapted to engage one side of said nut to prevent undue turning thereof about its worm.

A further object is to provide in steering gears of the stated character, an annular member on the pitman shaft having spaced abutment means thereon lying closely adjacent one side of the ball nut to prevent undue turning of the latter about its worm.

A still further object is to provide a steering gear of the stated character which is simple in construction, economic in manufacture and highly efficient in operation.

Other and further objects will become apparent as the description of the invention progresses.

Of the drawings;

Fig. 1 is a longitudinal sectional view taken through the lower extremities of a steering shaft showing the construction of the ball nut and lever and the specific operating connections therebetween, certain parts being broken away to more clearly show the structure of certain elements thereof.

Fig. 2 is a transverse sectional view taken substantially along line 2—2 of Fig. 1.

Fig. 3 is a fragmentary view, partly in section, of a portion of the pitman shaft and the ball nut mechanism, showing a modified means for preventing turning of the said nut about its worm, and Fig. 4 is a side view, partly in section, of the structure shown in Fig. 3, looking from left to right, parts thereof being broken away to more clearly show the structure of certain parts.

Referring to the drawings, the numeral 2 indicates generally a portion of a steering gear of the ball nut and lever type comprising a steering shaft 4 mounted in thrust roller bearings 6 and 8 provided at the opposite ends of a housing 10. A worm 12 is formed on shaft 4 and lies between bearings 6 and 8. Mounted on worm 12 is a ball nut structure 14 which is adapted for substantially nonrotatable movement between the ends of worm 12. The specific construction of worm 12 and ball nut 14 and the method of operation thereof is old in the art, and accordingly, a detailed description thereof will not be given herein. For a complete disclosure of such a mechanism reference may be had to United States Patent No. 2,380,662, granted to R. P. Means, Jr. on July 31, 1945. Suffice it to say that upon rotation of shaft 4 in one direction, nut 14 will move to the left (Fig. 1) and upon actuation of shaft 4 in the reverse direction, the nut 14 will move to the right, the balls 16 disposed between nut 14 and worm 12 providing a highly efficient anti-friction bearing for said worm and nut. Mounted at opposite sides 18 and 20 of nut 14 and in axial alignment are a pair of anti-friction trunnions 22 and 24. Trunnions 22 and 24 extend into yokes or bifurcated arms 26 and 28, respectively, secured to and extending outwardly at substantially right angles to a pitman shaft 30. As shown in Fig. 2, a roller 22ᵃ is mounted in a needle-type roller bearing 22ᵇ provided on trunnion 22. Trunnion 24 has a similar anti-friction roller mounted thereon.

Pitman shaft 30 is disposed at substantially right angles to shaft 4 and is mounted at one end in a needle type roller bearing 32 provided in the cover 34 of housing 10 and in a pair of spaced needle bearings 36 and 38 provided in the tubular extension 40 of the said housing. Pitman shaft 30 is held against axial movement in one direction by a stud bolt 42 making threaded engagement with a tapped opening provided in the upper end 44 of cap 34 and secured in adjusted position thereon by a lock nut 46. The pitman shaft 30 is held against axial movement in the opposite direction by means of flange 48. Flange 48 lies adjacent an annular boss 50 provided interiorly of casing 10, a gasket or washer 52 being provided between said flange and boss.

The anti-friction trunnions 22 and 24 and the arms of yokes 26 and 28, respectively, are so designed that a very slight amount of clearance is provided therebetween. Consequently, upon axial movement of nut 14 along worm 12, rolling contact is provided between said trunnions and the respective arms of yokes 26 and 28.

In order to prevent turning of nut 14 about worm 12 during operation of the device, a pair of spaced annular flanges 54 and 56 are provided on shaft 30 which normally lie in slightly spaced relation with a pair of flat, smooth shoulders 58 and 60, respectively, disposed on the adjacent side 62 of nut 14. By providing a slight amount of clearance between flanges 54, 56, and shoulders 58 and 60, no binding occurs between the yokes 26 and 28 and trunnions 22 and 24. The pressure exerted on the yokes by the trunnions during movement of the nut in either direction from centered position will become equalized and there is little tendency of the nut to turn about worm 12. As the parts approach their centered position the tendency to equalize the pressure on the trunnions 22 and 24 is not effective and, consequently, the nut may turn slightly about worm 12 bringing shoulder 58 or 60, as the case may be, into engagement with flange 54 or 56 on pitman shaft 30. Upon continued movement of nut 14 along worm 12, sliding contact occurs between the nut and pitman shaft. This turning movement of nut 14, however, is not sufficient to cause binding or scuffing of the trunnions 22 and 24 in yokes 26 and 28.

The lower end of pitman shaft 30 has splined thereto in the usual manner a pitman arm 64 which is connected in the usual manner to the usual mechanism (not shown) which in turn is operatively connected to the steering knuckles disposed adjacent the wheels of the vehicle. Arm 64 is retained on shaft 30 by means of lock nut 66. A lubricant seal 68 of any suitable construction is provided between shaft 30 and tubular extension 40 near the lower end of the latter to prevent leakage of lubricant from the interior of the casing 10 and said extension.

Should dampening of the movement of the steering gear be desired when in centered position, the portion of the thread of the worm 12 at the center thereof intermediate its ends may be made a trifle large. This would cause preloading of the balls 16 when the gear is in centered position but said balls would be free at all other positions thereof.

Figs. 3 and 4 illustrate a modification which employs a somewhat different means for preventing turning of the ball nut about its worm. The steering shaft of this construction also has provided thereon a worm 12 at one end thereof which may be mounted in thrust bearings (not shown) similar to bearings 6 and 8 provided in the enclosing housing 10. A ball nut structure 14 is mounted on worm 12 and is also adapted for substantially nonrotatable movement lengthwise of the latter. Instead of providing a pair of spaced flanges 54 and 56 on the pitman shaft 30, a separate, semicylindrical member 82 is mounted on the portion 86 of said shaft disposed between the forked arms or yokes 26 and 28, which as in the structure shown in Figs. 1 and 2, receive anti-friction trunnions 22 and 24, respectively, extending from opposite sides of nut 14. The portion 86 of shaft 30 has provided intermediate the ends thereof a pair of diametrically opposed recesses 92. The portion of the edges of semicylindrical member 82 disposed adjacent to recesses 92 are punched inwardly as shown at 94 so as to enter said recesses slightly as shown in Fig. 3, thereby effectively securing the said member 82 on pitman shaft 30. Member 82 has provided near each end thereof a semicylindrical flange 96 which is adapted to lie in slightly spaced relation with a smooth flat offset portion 98 provided on the inner surface 100 of nut 14. The flanges 96 cooperate with nut 14 in a similar manner as the flanges 54 and 56 on pitman shaft 30 in the structure shown in Figs. 1 and 2 and also operate to prevent turning of nut 14 about worm 12 to any material degree. Binding or scuffing of the parts therefore is prevented and proper operation assured under all conditions of operation.

From the foregoing description it is seen that novel and simplified means have been provided for preventing turning of the nut about its shaft and thereby avoiding undesirable binding or scuffing of the trunnions in the yokes.

While the invention has been described in connection with steering gears for motor and other vehicles, it is apparent that the invention is equally adaptable for other uses wherein power transmission is desired. It will also be apparent that the invention as shown and described herein is subject to modification and change without departing from the scope thereof. It therefore is to be understood that it is not intended to limit the invention to the embodiments shown and described herein but only by the scope of the claims which follow.

We claim:

1. Power transmitting means comprising, a worm, a nut mounted on said worm and adapted for movement from a starting position on the latter to positions on either side of said starting position, rockable means driven by said nut, spaced abutment means on said rockable means and on one side of said nut, said abutment means being out of contact during travel of said nut away from said starting position in either direction, and said nut being adapted to turn slightly about said worm as it approaches said starting position, thereby bringing one of said abutments on said rockable means and nut into engagement with each other and causing slight frictional contact therebetween.

2. Power transmitting means comprising, a worm, a nut mounted on said worm and adapted for movement from a starting position on the latter to positions on either side of said starting position, a rock shaft disposed at an angle to said worm, spaced bifurcated arms secured to said rock shaft, oppositely disposed trunnions on said nut mounted in operative relation with said arms, and spaced means on said rock shaft adapted to prevent undue turning of said nut about said worm during operation of said nut in either direction from said starting position.

3. Power transmitting means comprising, a worm, a nut mounted on said worm and adapted for movement from a starting position on the latter to positions on either side of said starting position, a rock shaft disposed at substantially right angles to said worm, spaced bifurcated arms secured to said rock shaft, oppositely disposed trunnions on said nut mounted in operative relation with said arms, and spaced annular flanges on said rock shaft adapted to prevent undue turning of said nut about said worm during movement of said nut in either direction from said starting position.

4. Power transmitting means comprising, a worm, a nut mounted on said worm and adapted for movement from a starting position on the latter to positions on either side of said starting position, a rock shaft disposed at substantially right angles to said worm, spaced bifurcated arms secured to said rock shaft, oppositely disposed trunnions on said nut mounted in operative relation with said arms, an arcuate member mounted on said rock shaft between said bifurcated arms, and spaced arcuate flanges on said member lying in close proximity to one side of said nut whereby undue turning of said nut is prevented.

5. Power transmitting means comprising, a worm, anti-friction bearings for said worm, a ball nut mounted on said worm, a rock shaft disposed at substantially right angles to said worm, anti-friction bearings for said rock shaft, one or more bifurcated arms secured to said rock shaft, one or more trunnions mounted on said nut, one for each of said arms, anti-friction means on said trunnions providing rolling contact between said trunnions and said arms, and spaced annular flanges on said rock shaft lying in close proximity to said nut whereby undue turning of said nut about its worm is prevented.

6. Power transmitting means comprising, a worm, anti-friction bearings for said worm, a ball nut mounted on said worm, a rock shaft disposed at substantially right angles to said worm, anti-friction bearings for said rock shaft, one or more bifurcated arms secured to said rock shaft, one or more trunnions mounted on said nut, one for each of said arms, anti-friction means on said trunnion providing rolling contact between said trunnions and said arms, and means for preventing undue turning of said nut about its worm, said last mentioned means comprising an arcuate member secured to said pitman shaft, and spaced abutment means on said arcuate member lying closely adjacent one side of said nut.

7. In a steering gear, the combination of a steering shaft, a worm on said shaft, a ball nut mounted on said worm and adapted for movement from a starting position on the latter to positions on either side of said starting position, a pitman shaft disposed at substantially right angles to said worm, a pair of spaced bifurcated arms secured to said pitman shaft, anti-friction trunnions secured to and extending from opposite sides of said nut disposed between the bifurcations of said arms and in slightly spaced relation therewith, and means for preventing undue turning of said nut about its worm, said last mentioned means comprising an arcuate member secured to said pitman shaft between said bifurcated arms, and spaced abutment means on said arcuate member lying in close proximity to said nut.

8. In a steering gear, the combination of a steering shaft, a worm on said shaft, anti-friction bearings for said worm, a ball nut mounted on said worm, a pitman shaft disposed at substantially right angles to said worm, anti-friction bearings for said pitman shaft, a pair of spaced bifurcated arms on said shaft, trunnions having anti-friction roller means thereon extending from opposite sides of said ball nut and adapted to extend between the bifurcations of said arms, clearance being provided between said bifurcations and trunnions enabling rolling contact of said trunnions thereon, and spaced means on said ball nut and pitman shaft for preventing undue turning of said ball nut about said worm.

WILLIAM H. DOERFNER.
JOHN C. HELVESTON.

References Cited in the file of this patent

UNITED STATES PATENTS

| Number | Name | Date |
|--------|------|------|
| 695,222 | Mooers | Mar. 11, 1902 |
| 698,407 | Malicet et al. | Apr. 22, 1902 |
| 1,343,846 | Rapson | June 15, 1920 |
| 1,351,937 | Alldredge | Sept. 7, 1920 |
| 1,512,424 | Jones | Oct. 21, 1924 |
| 2,045,811 | Twyman | June 30, 1936 |